C. R. TWITCHELL.
PRESSURE GAGE FOR PNEUMATIC TIRES.
APPLICATION FILED OCT. 9, 1908.
927,298.
Patented July 6, 1909.
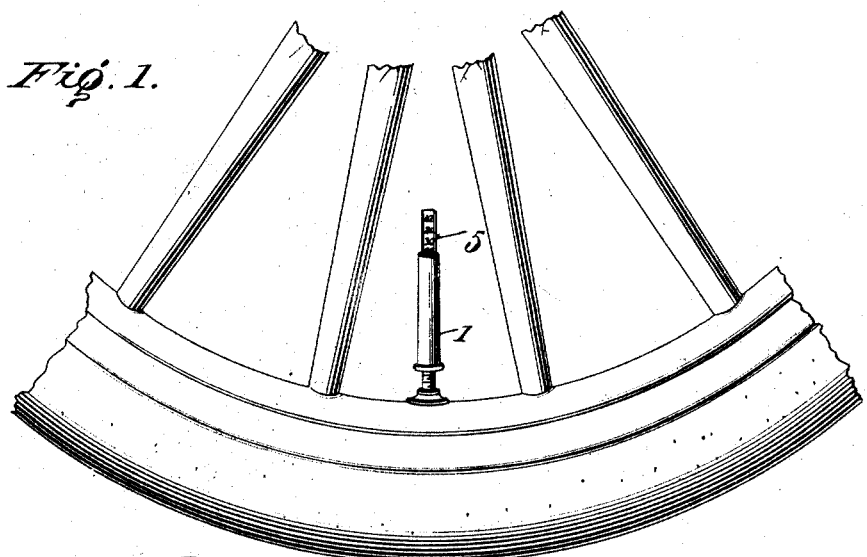
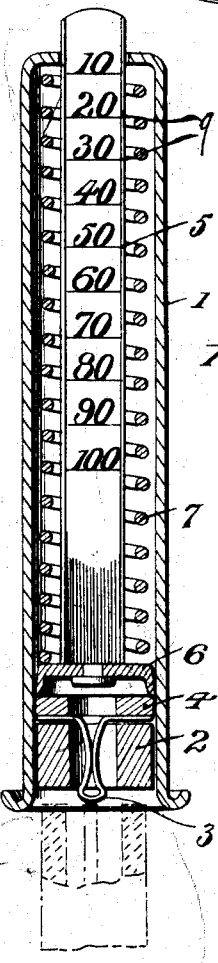
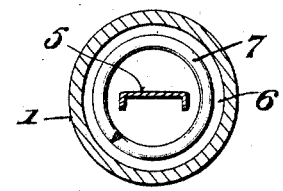
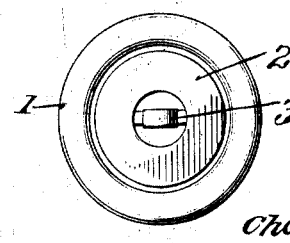
Inventor
Charles R. Twitchell

CHARLES R. TWITCHELL, OF LOS ANGELES, CALIFORNIA.

PRESSURE-GAGE FOR PNEUMATIC TIRES.

No. 927,298.   Specification of Letters Patent.   Patented July 6, 1909.

Application filed October 9, 1908.   Serial No. 456,953.

*To all whom it may concern:*

Be it known that I, CHARLES R. TWITCHELL, of Los Angeles, in the county of Los Angeles and State of California, have invented certain new and useful Improvements in Pressure-Gages for Pneumatic Tires; and I do hereby declare the following to be a full, clear, and exact description of the invention, such as will enable others skilled in the art to which it appertains to make and use the same.

The primary object of this invention is to provide a device for readily ascertaining the pressure within a pneumatic tire, which device will be simple and compact, and capable of being readily applied to the air valve of a tire.

The invention will be hereinafter fully set forth and particularly pointed out in the claims.

In the accompanying drawing: Figure 1 is a view in perspective. Fig. 2 is a vertical longitudinal sectional view. Fig. 3 is a cross sectional view. Fig. 4 is an end view.

Referring to the drawings, 1 designates a housing which is preferably in the form of a tubular body in one end of which is formed a narrow slot, while the other end is open. Within this open end of the housing is fitted a ring-like packing 2 of leather or other suitable material, which packing has a central opening through which projects a fixed part, shown in the form of an anvil 3. This anvil is preferably composed of a piece of metal bent back upon itself, and secured at its ends to a fixed washer 4 within the housing near the open end thereof. The packing 2 forms a seat for the valve-casing of a pneumatic tire, the valve itself being unseated by the projecting end of the anvil.

5 designates a gage bar located within the housing and projecting through the slot in one end thereof. At the inner end of this bar is a piston head 6 which is shown in the form of a cupped-washer against which bears one end of a coiled spring 7 which normally holds the gage bar retracted, the other end of such spring bearing against the slotted end of the housing. The inward movement of the gage bar is limited by the stop formed by washer 4.

When it is desired to ascertain the pressure within a pneumatic tire the operator positions the open end of the tubular body or housing over the outer end of the casing of the air valve of such tire. In so doing, the anvil, or fixed part, of the device engages the projecting end of the valve and effects the unseating of the latter. The air pressure within the tire will act against the washer or piston head of the gage bar and immediately force the latter outward as against the tension of spring 7. This gage bar carries on one side a series of marks of graduation, as shown at 9, indicating pounds pressure per square inch, and hence as the bar is forced outward the pressure existing within the tire is indicated by the marks of graduation. Immediately upon removing the device the valve of the tire will, of course, automatically resume its seat. In this way, by means of a very simple and inexpensive device, capable of being carried in the pocket of the user, the pressure within a pneumatic tire may be ascertained without danger of unduly lessening such pressure.

By means of this device all users of pneumatic tires are enabled to guard against over charging which frequently results in serious loss.

I claim as my invention:

1. As an article of manufacture, a pressure gage for pneumatic tires comprising a housing open at its inner end, which latter is designed to fit over and inclose the casing of the air valve of a pneumatic tire, means at such end for fitting against and unseating such air valve, a spring-held gage-bar within said housing and projecting through an opening in the outer end thereof, and a piston-head at the inner end of said gage-bar.

2. As an article of manufacture, a pressure gage for pneumatic tires comprising a housing open at one end, a seat at such end for fitting against the air-valve casing of a pneumatic tire, means also at such end for unseating such air-valve, and a spring-held gage-bar within said housing and projecting through an opening in the outer end thereof, said gage-bar having a piston-head at its inner end.

3. As an article of manufacture, a pressure gage for pneumatic tires comprising a housing open at one end, a seat at such end for fitting against the air-valve casing of a pneumatic tire, said seat having a central opening, a fixed part extended through said opening for unseating such air-valve, and a spring-held gage bar located within said housing and projecting through an opening in the outer end thereof, said gage-bar having a piston head at its inner end.

4. As an article of manufacture, a tubular body open at one end and having a slot in its other end, a gage bar within said body extended through said slot, a piston-head at the inner end of said gage-bar, a spring on said gage bar, a stop for limiting the inward movement of the latter, and a fixed part within the open end of said body for effecting the unseating of the air valve of a pneumatic tire.

In testimony whereof, I have signed this specification in the presence of two subscribing witnesses.

CHARLES R. TWITCHELL.

Witnesses:
FRED. W. NASH,
M. COLYER.